(12) United States Patent
Willis et al.

(10) Patent No.: US 8,978,289 B2
(45) Date of Patent: Mar. 17, 2015

(54) CHAIN SKIRT FISHING LURES AND ASSOCIATED MANUFACTURING METHODS

(76) Inventors: Brett Willis, McDonough, GA (US); Jackie Hammond, McDonough, GA (US)

(*) Notice: Subject to any disclaimer, the term of this patent is extended or adjusted under 35 U.S.C. 154(b) by 805 days.

(21) Appl. No.: 12/113,047

(22) Filed: Apr. 30, 2008

(65) Prior Publication Data

US 2009/0172993 A1 Jul. 9, 2009

Related U.S. Application Data

(60) Provisional application No. 61/019,718, filed on Jan. 8, 2008.

(51) Int. Cl.
*A01K 85/10* (2006.01)
*A01K 85/00* (2006.01)

(52) U.S. Cl.
CPC .................................. *A01K 85/00* (2013.01)
USPC ....... 43/42.13; 43/42.11; 43/42.28; 43/42.31; 43/42.15; 43/42.39

(58) Field of Classification Search
USPC ............ 43/42.31, 42.11, 42.13, 42.15, 42.19, 43/42.28, 17.2, 42.39
See application file for complete search history.

(56) References Cited

U.S. PATENT DOCUMENTS

| | | | | |
|---|---|---|---|---|
| 582,677 A * | 5/1897 | Parker | | 43/42.15 |
| 1,849,899 A * | 3/1932 | Wright et al. | | 43/42.25 |
| 2,027,069 A * | 1/1936 | Sorenson | | 43/42.26 |
| 2,167,334 A * | 7/1939 | Hayes | | 43/42.11 |
| 2,185,668 A * | 1/1940 | Hurdle | | 43/42.28 |
| 2,261,549 A * | 11/1941 | Hayes | | 43/42.11 |
| 2,316,048 A * | 4/1943 | Clarke | | 43/42.24 |
| 2,494,012 A * | 1/1950 | Stricker | | 43/17.2 |
| 2,636,304 A * | 4/1953 | Wyman | | 43/42.24 |
| 2,676,430 A * | 4/1954 | Richard | | 43/17.2 |
| 2,708,805 A * | 5/1955 | Garvie | | 43/42.15 |
| D175,099 S * | 7/1955 | Bahr | | 43/42.19 |
| 2,722,766 A * | 11/1955 | Accetta | | 43/42.24 |
| 2,732,650 A * | 1/1956 | Passmore, Jr. et al. | | 43/17.2 |
| 2,764,833 A * | 10/1956 | Clark | | 43/17.2 |
| 2,785,497 A * | 3/1957 | Cordell | | 43/42.26 |

(Continued)

FOREIGN PATENT DOCUMENTS

FR 2806875 A1 * 10/2001 ............. A01K 85/01
GB 2258128 A * 2/1993 ............. A01K 85/00

(Continued)

*Primary Examiner* — Darren W Ark
(74) *Attorney, Agent, or Firm* — Troutman Sanders LLP; Ryan A. Schneider; John A. Morrissett

(57) ABSTRACT

Chain skirt fishing lures and associated manufacturing methods are provided. According to some embodiments, a skirt body for a fishing lure comprises a plurality of flexible elements. The plurality of flexible elements of a skirt body can extend from a body portion of a head of a lure body to one or more points distal from the head of the lure body. At least one of the plurality of flexible elements of the skirt body can comprise multiple elements connected together to form an elongated skirt element. The elongated skirt element can extend from a point proximate the head of the lure body to a point distal the head of the lure body. The flexible elements can facilitate fish attraction, thereby leading to increased fish striking compared to conventional lures. Other embodiments are also claimed and described.

20 Claims, 5 Drawing Sheets

(56) References Cited

U.S. PATENT DOCUMENTS

| | | | | |
|---|---|---|---|---|
| 2,801,489 A * | 8/1957 | Gehring | | 43/17.2 |
| 2,807,905 A * | 10/1957 | Ford | | 43/17.2 |
| 2,814,086 A * | 11/1957 | Bahr | | 43/44.83 |
| 2,857,703 A * | 10/1958 | Parmlee | | 43/42.28 |
| 2,865,130 A * | 12/1958 | Accetta | | 43/42.15 |
| 3,021,632 A * | 2/1962 | Gombar | | 43/42.28 |
| 3,110,979 A * | 11/1963 | Woodley | | 43/42.13 |
| 3,163,955 A * | 1/1965 | Lockwood | | 43/17.2 |
| 3,229,407 A * | 1/1966 | Quyle | | 43/42.18 |
| 3,246,415 A * | 4/1966 | Forbes | | 43/17.2 |
| 3,344,550 A * | 10/1967 | Peters | | 43/42.11 |
| 3,427,744 A * | 2/1969 | Roberts | | 43/42.05 |
| 3,429,066 A * | 2/1969 | McClellan | | 43/42.24 |
| 3,440,757 A * | 4/1969 | McClellan | | 43/42.24 |
| 3,537,207 A * | 11/1970 | McClellan et al. | | 43/42.24 |
| 3,688,429 A * | 9/1972 | Mauck | | 43/17.2 |
| 3,729,854 A * | 5/1973 | Satama | | 43/17.2 |
| 3,772,815 A * | 11/1973 | Burgess | | 43/17.2 |
| 3,867,781 A * | 2/1975 | Wolfe | | 43/42.28 |
| 3,918,192 A * | 11/1975 | Rabideau | | 43/42.17 |
| 3,940,869 A * | 3/1976 | Roberts | | 43/42.24 |
| 3,965,606 A * | 6/1976 | Bingler | | 43/42.24 |
| 3,987,573 A * | 10/1976 | Clayton | | 43/17.2 |
| 3,992,800 A * | 11/1976 | Neil | | 43/42.24 |
| 3,996,688 A * | 12/1976 | Hardwicke, III | | 43/42.28 |
| 4,033,065 A * | 7/1977 | Shannon | | 43/42.13 |
| 4,085,537 A * | 4/1978 | Todd | | 43/17.2 |
| 4,133,134 A * | 1/1979 | Cheng | | 43/42.06 |
| 4,142,319 A * | 3/1979 | Mihaljevic | | 43/42.39 |
| 4,235,037 A * | 11/1980 | Sivertsen | | 43/44.91 |
| 4,742,639 A * | 5/1988 | Gunn | | 43/42.13 |
| 4,777,758 A * | 10/1988 | Phillips | | 43/42.09 |
| 4,815,233 A * | 3/1989 | Pingel | | 43/42.13 |
| 4,850,131 A * | 7/1989 | Standish, Jr. | | 43/42.53 |
| 4,884,358 A * | 12/1989 | Grove et al. | | 43/42.13 |
| 4,888,908 A * | 12/1989 | Morris | | 43/42.19 |
| 4,891,901 A * | 1/1990 | Baker, Jr. | | 43/42.13 |
| 4,893,430 A * | 1/1990 | Barfield | | 43/42.24 |
| 4,972,623 A * | 11/1990 | Delricco | | 43/17.6 |
| 5,113,615 A * | 5/1992 | Drachkovitch | | 43/42.19 |
| 5,485,696 A * | 1/1996 | Barton | | 43/17.2 |
| 5,709,047 A * | 1/1998 | Link | | 43/42.31 |
| 5,953,848 A * | 9/1999 | Darnell et al. | | 43/42.28 |
| 6,199,312 B1 * | 3/2001 | Link | | 43/42.28 |
| 6,272,787 B1 * | 8/2001 | Link | | 43/42.28 |
| 6,442,886 B1 * | 9/2002 | McAfee et al. | | 43/17.2 |
| 6,598,336 B2 * | 7/2003 | Link | | 43/42.28 |
| 6,601,336 B1 * | 8/2003 | Link | | 43/42.13 |
| 6,665,977 B2 * | 12/2003 | Hammond | | 43/42.13 |
| 6,675,524 B2 * | 1/2004 | McNally et al. | | 43/42.13 |
| 6,701,662 B1 * | 3/2004 | Moore | | 43/42.13 |
| 6,763,631 B1 * | 7/2004 | Santini | | 43/42.24 |
| 7,010,881 B2 * | 3/2006 | Altman | | 43/42.13 |
| 7,174,670 B2 * | 2/2007 | Lizardo et al. | | 43/42.24 |
| 7,360,335 B2 * | 4/2008 | Edwards | | 43/42.13 |
| 7,694,453 B1 * | 4/2010 | Arrico | | 43/42.13 |
| 8,091,271 B2 * | 1/2012 | Mayer | | 43/42.28 |
| 8,230,639 B2 * | 7/2012 | Langer et al. | | 43/42.28 |
| 8,458,950 B2 * | 6/2013 | Mayer | | 43/42.28 |
| 2002/0073607 A1 * | 6/2002 | Hickok et al. | | 43/42.28 |
| 2002/0144450 A1 * | 10/2002 | Caraway | | 43/17.2 |
| 2004/0107627 A1 * | 6/2004 | Rodely | | 43/42.19 |
| 2005/0166444 A1 * | 8/2005 | Taylor | | 43/42.13 |
| 2006/0080886 A1 * | 4/2006 | Gawlik | | 43/42.19 |
| 2006/0242887 A1 * | 11/2006 | Toman | | 43/42.19 |
| 2007/0234633 A1 * | 10/2007 | Uselman et al. | | 43/42.13 |
| 2008/0202015 A1 * | 8/2008 | Langer | | 43/42.28 |
| 2009/0126256 A1 * | 5/2009 | Gregory | | 43/42.19 |
| 2009/0133314 A1 * | 5/2009 | Mayer | | 43/42.32 |
| 2009/0211144 A1 * | 8/2009 | Murphy | | 43/42.15 |

FOREIGN PATENT DOCUMENTS

| | | | | |
|---|---|---|---|---|
| GB | 2398717 A * | 9/2004 | | A01K 85/00 |
| JP | 09298983 A * | 11/1997 | | A01K 83/00 |
| JP | 2005176769 A * | 7/2005 | | A01K 85/00 |
| JP | 2005229824 A * | 9/2005 | | A01K 85/00 |
| JP | 2006217812 A * | 8/2006 | | A01K 85/10 |
| JP | 2008118898 A * | 5/2008 | | A01K 85/10 |

* cited by examiner

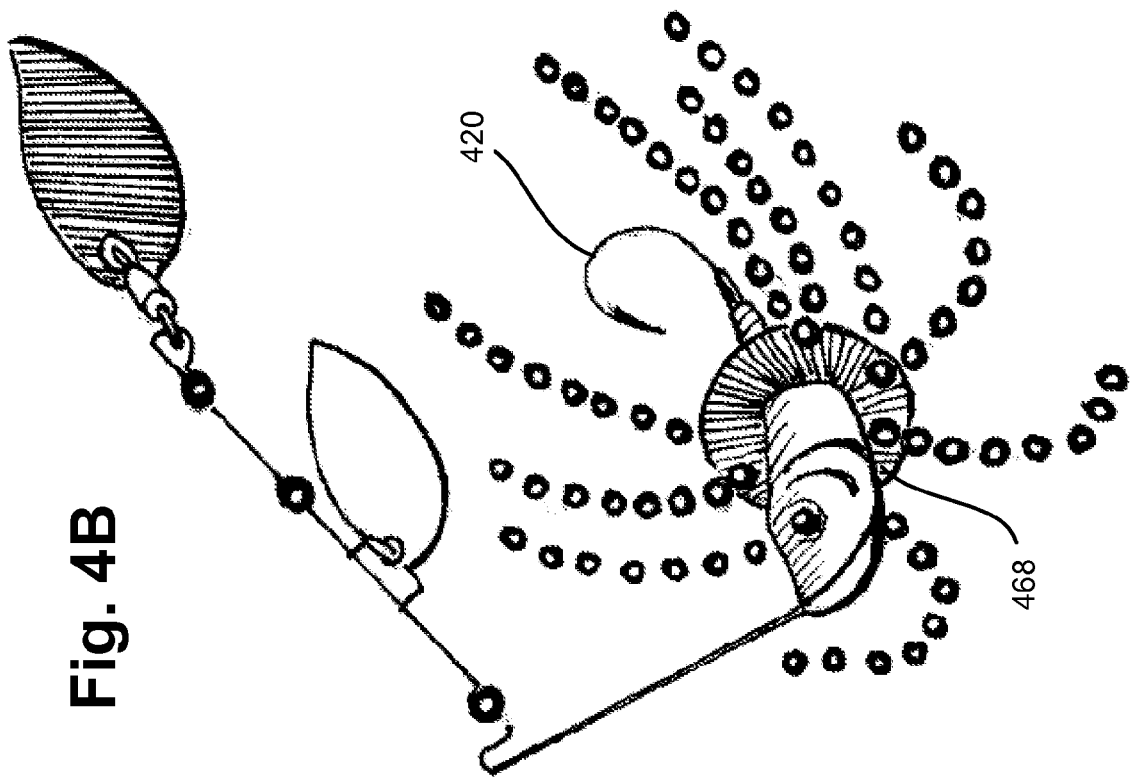
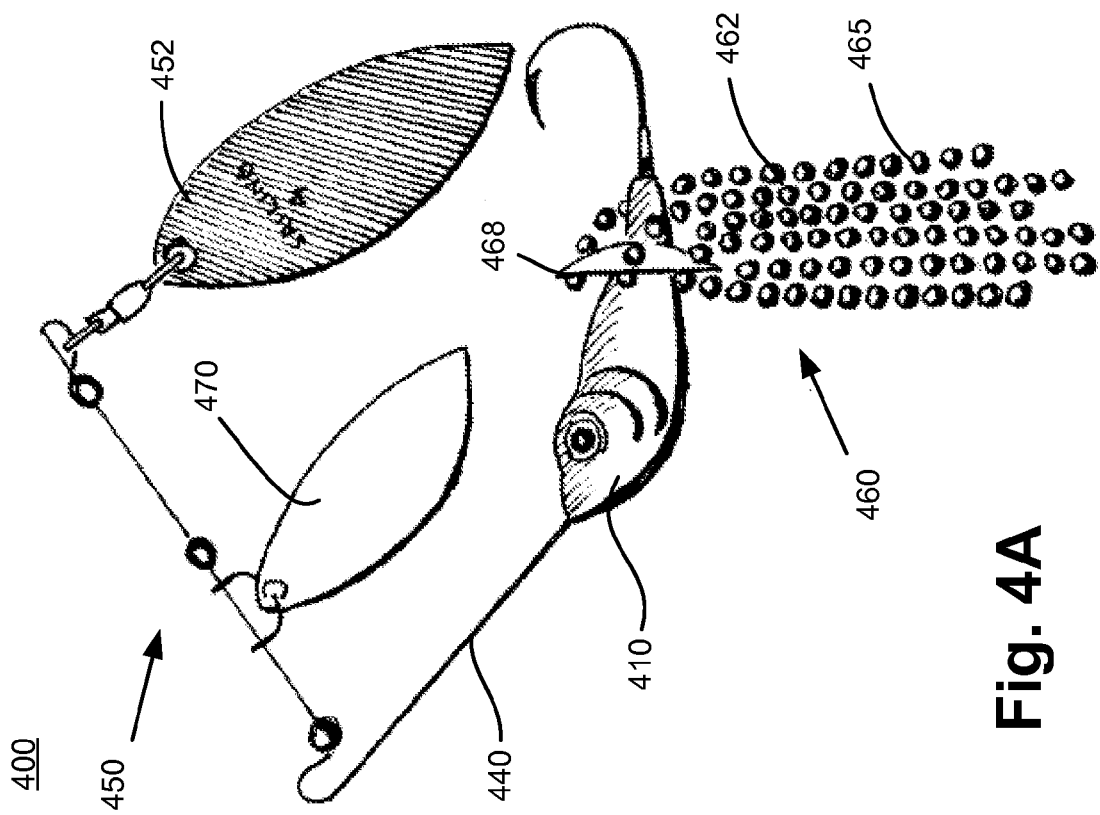

CHAIN SKIRT FISHING LURES AND ASSOCIATED MANUFACTURING METHODS

CROSS-REFERENCE TO RELATED APPLICATION & PRIORITY CLAIM

The present application claims priority to and the benefit of U.S. Provisional Patent Application No. 61/019,718, filed 8 Jan. 2008, and entitled "Chain Skirt Fishing Lure And Associated Manufacturing Methods," which is hereby incorporated by reference in its entirety as if fully set forth below.

TECHNICAL FIELD

The various embodiments of the present invention relate generally to fishing lures, and more specifically, embodiments of the invention include a fishing lure comprising a chain skirt and chain skirts for fishing lures.

BACKGROUND

Artificial lures are typically configured to simulate the life-like action of fresh and salt water fish and other bait. It is well known to fishermen that different fish are attracted to different colors and sizes of fishing lures. Fishermen have noticed that certain lakes, bays, and off-shore fishing yield different results with different colors and sizes of lures. This difference depends in part upon a number of factors, including water clarity and temperature. Thus, on a certain day in a certain lake, a lure configuration in yellow can yield one result, while the same lure configuration in red might yield an entirely different result. A larger skirt may make a bait appear larger and, thus, may affect the size of fish caught. And in some situations, fish may be attracted to multicolored skirts or skirts having reflective properties.

Ideally, fish react to a lure as if the lure were food, or as if it were a threat within the fish's territory. Conventional lure skirts are used to enhance and exaggerate lure movements to make the lure more attractive to target fish. Skirts are also used to camouflage the hook in the lure. It is believed that colored skirts attract attention, agitate fish, or exaggerate lure movement.

Lure skirts generally comprise a head or collar member and a plurality of attached trailing strands. Strands can conceal the hook and which are usually made from an elastomer. Skirts are formed from a flat sheet of cured elastomer cut to have a waistband at one end and elongate trailing filaments at the other end.

BRIEF SUMMARY

Briefly described, embodiments of the present invention comprise a fishing lure, a skirt for a fishing lure, and a method of manufacturing such a fishing lure or fishing lure skirt. In a preferred embodiment, the fishing lure comprises a lure body or body portion, a hook assembly or hook, and a skirt assembly. The hook assembly, or hook, may extend from an end of the lure body. The skirt assembly can be carried by the lure body. Additionally, the skirt assembly can be disposed at least partially around the lure body and can comprise multiple skirt elements, such as arms or strands.

The strands, or at least one of the strands, can comprise multiple linked or interlocked elements connected together linearly, into a strand, extending from points proximate the lure body to points distal the lure body. A spacer may separate one or more of the strands away from the lure body. The spacer can be carried by the body and situated between the lure body and the strands such that the spacer is connected to the lure body, and the strands are connected to and extend from the spacer. Alternatively or additionally, the lure body can define one or more apertures. One or more strands can connect to the apertures in the lure body so that the strands extend directly from the lure body. The strands can also be adhered directly to the lure body without use of such apertures. Together, the strands can form a partial metallic shroud spaced apart from the lure body, the hook, or both.

The strands can comprise multiple linked elements, or coupled components, adapted to flex relative to one another. Flex points may exist along the length of the strands at the connections of one linked element to another. The linked elements can have reflective exteriors, resulting in the strands being comprised of multiple reflective elements.

The linked elements can be pivotably connected to one another. They can be comprised of metallic or metallic-like material that may be reflective. Additionally, the linked elements can be operatively coupled to one other such that each of the linked elements can flex relative to at least one other proximate linked element to enable the plurality of linked elements to flex relative to one other. Each of the linked elements may be connected to at least one of the other multiple linked elements, such that the strands comprise a plurality of flex points along the lengths of the strands. Preferably, the linked elements are interlocked in a way that allows them to be flexible in relation to one another, thereby allowing the strands to be flexible at multiple points along their entire lengths.

Linked elements can comprise multiple chain links, ball elements, strand elements, or any other elements that can be interlocked. As part of the strands, linked elements extend linearly from points proximate the body to points distal the body. Linked elements may be substantially similar in geometric shape to one another; they may be constructed in the same basic form with differences being primarily attributed to their manufacturing process.

Preferably, linked elements are composed of metal or some other material for attracting fish. One or more of the flexible strands can comprise sound points at the interaction points of the linked elements. When linked elements move against one another, the sound points may emit audible sound along the length of the strands when moved through a medium. This sound may attract fish. Linked elements may also be a strand of beads, with each bead comprising an extension and an aperture. The extension of each bead can be configured for insertion into the aperture of an adjacent bead.

Because of the flexible nature of the arms, the arms can vibrate underwater, thereby producing sound for attracting fish. Additionally, when the arms strike underwater objects, sound can be produced, which may also attract fish. Further, because the linked elements may be metal, the lure body can be constructed of a lighter material than is standard in the art, and the weight density of the fishing lure can be substantially constant along the length of the fishing lure. In some embodiments, mass of the lure body can be reduced, and total mass of the lure can be evenly distributed throughout the length of the lure through use of metallic elements in the chain skirt.

Manufacturing embodiments of a fishing lure may involve providing a lure body. The lure body can have a head at one end and a hook at the other end. A plurality of strands, or arms, can be provided. Each arm may be segmented into multiple parts, where the multiple parts have substantially similar shapes. Each of the multiple parts can be linked to at least one other to form the strands. The multiple parts can be linked together in such a way that, when the lure body moves in a non-linear fashion, the strands sway. Each strand can be affixed to the lure body, or to a point proximate the lure body, and can extend to a point distal the lure body. Together, the strands can form an elongated skirt. Additionally, a spacer can be provided. The spacer can be affixed at least partially around the lure body. The strands may be connected directly to the spacer, so that they extend from the spacer to points distal the spacer.

Other aspects and features of embodiments of the present invention will become apparent to those of ordinary skill in the art, upon reviewing the following description of specific, exemplary embodiments of the present invention in conjunction with the accompanying figures.

BRIEF DESCRIPTION OF THE DRAWINGS

FIG. 4A illustrates a side view of a spinnerbait fishing lure in accordance with an embodiment of the present invention, the spinnerbait including a spacer.

FIG. 4B illustrates a perspective view of the fishing lure of FIG. 4A.

DETAILED DESCRIPTION OF PREFERRED & ALTERNATIVE EMBODIMENTS

Figure 1A:
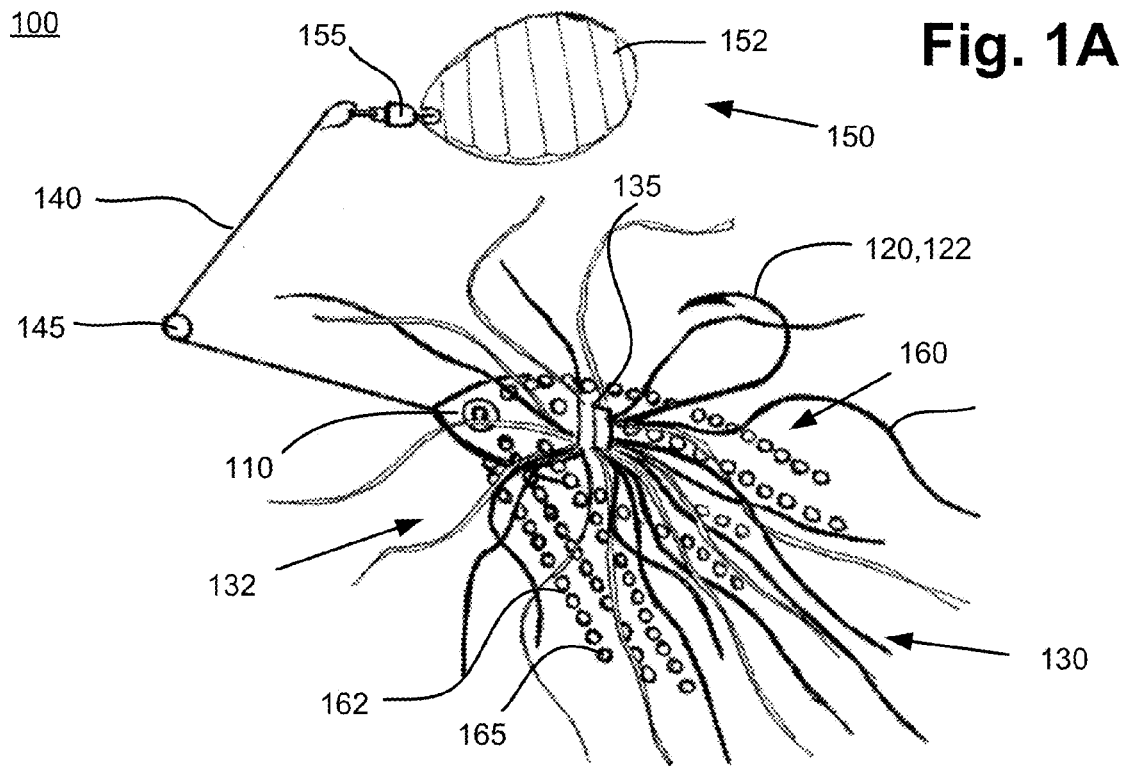
FIG. 1A illustrates a side view of a spinnerbait fishing lure in accordance with an embodiment of the present invention.

To facilitate an understanding of the principles and features of the invention, various illustrative embodiments are explained below. In particular, the invention is described in the context of being a chain skirt for a fishing lure. Embodiments of the invention, however, are not limited to a chain skirt for a fishing lure. Rather, embodiments of the invention include a skirt of linked elements, a fishing lure with such a skirt, and a method for manufacturing such a skirt and a fishing lure. And the devices described hereinafter as a chain skirt need not comprise chain links.

The materials described hereinafter as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

Various embodiments of the present invention comprise a fishing lure, a chain skirt for a fishing lure, and a method of manufacturing such fishing lure and chain skirt. A preferred embodiment of the present invention can comprise a lure body, a hook assembly, and a chain skirt.

Referring now to the figures, wherein like reference numerals represent like parts throughout the views, embodiments of the present invention will be described in detail.

Figure 1B:
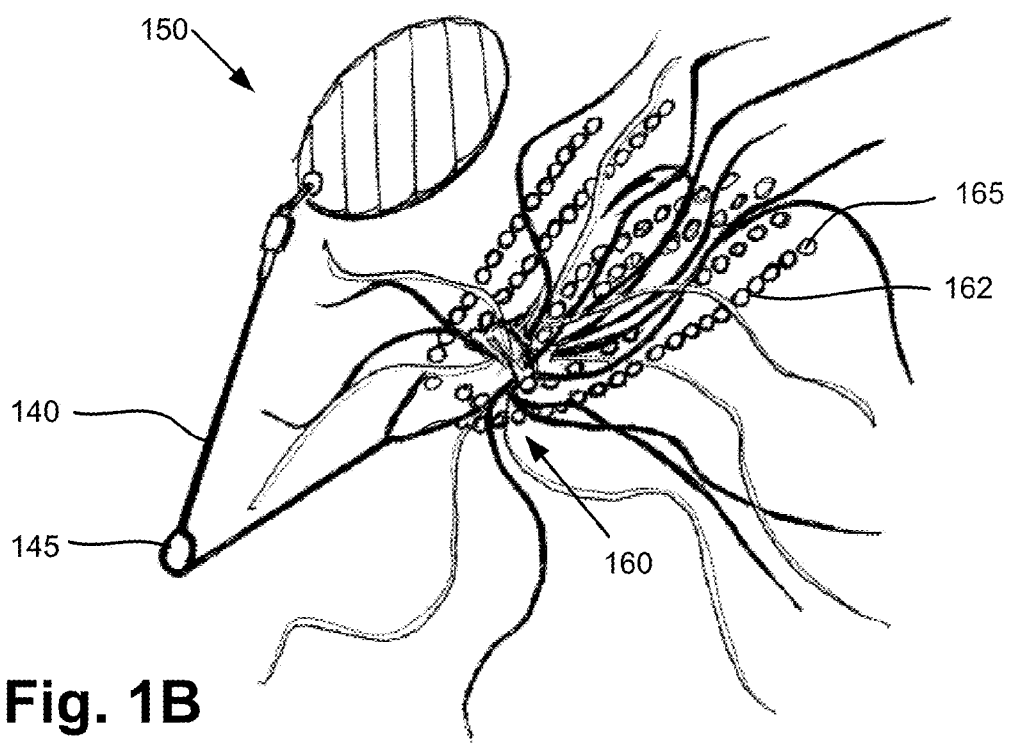
FIG. 1B illustrates a top view of the fishing lure of FIG. 1A.

FIG. 1A and FIG. 1B show two perspective illustrations of a spinnerbait fishing lure 100 in accordance with an embodiment of the present invention. FIG. 1A shows a side view, and FIG. 1B shows a top view. This preferred embodiment is a fishing lure 100 comprising a lure body 110, a hook assembly 120, a conventional skirt 130, a V-wire 140, a spinner assembly 150, and a chain skirt 160.

Embodiments of the present invention can comprise one or more skirts, including without limitation a chain skirt 160 and a conventional skirt 130. The chain skirt 160 can consist of a chain, metallic elements, or multiple interlocked elements forming a skirt element. The various skirts of the present invention can be utilized on a number of lure types. For example, skirts according to the present invention can be used on spinnerbaits, such as that depicted in FIG. 1, and other types of lures in either freshwater or saltwater environments.

The lure body 110 can be decorated as a baitfish to attract fish. The lure body 110, which can comprise a head body portion, is preferably weighted for casting and may be composed of lead. The lure body 110 may be designed to simulate the appearance of an aquatic creature (e.g., a baitfish), it may be undecorated, or it may be decorated in any manner. The lure body 110 may be of a relatively small size, to attract fish in freshwater, or it may be of a larger size, to attract fish in saltwater.

The hook assembly 120 can comprise a single hook 122. Alternatively although not depicted, the hook assembly 120 can comprise a double hook, a treble hook, or any other type of hook. The hook 122 is attached to one end of the lure body 110. Although not the case in this embodiment, the hook assembly 120 may also comprise an eye, through which to attach the line of the fishing rod.

The conventional skirt 130 can comprise strands 132, probably composed of silicone. The conventional skirt 130 can be attached to the lure body 110 by means of a collar 135 wrapped around the lure body 110. The V-wire 140 is preferably a resilient wire, and extends from the lure body in a V-shape. At the point of the "V" can be the eye 145, where the fishing line is attached to the fishing lure 100. At the other end of the "V" may be the spinner assembly 150. The spinner assembly may comprise a spinner blade 152, and a barrel swivel 155 for spinning the spinner blade 152. Spinning of the spinner blade 152 can act as an additional attractor of fish.

The chain skirt 160 can comprise multiple extensions, arms, or strands 162. One end of a strand 162 can be located proximate the lure body 110, and the strands 162 can extend away from the lure body 110. The elongated strands 162 can together form an elongated skirt, extending away from the lure body 110.

Each strand 162 can comprise a string of linked elements 165. Preferably, in some embodiments, the linked elements are metallic or some metallic-like material. The linked elements 165 may be beads, chain links, ball elements, strand elements, or any other elements. The linked elements 165 can be arranged in a line so that they extend linearly away from the lure body 110. The linked elements 165 can flex in relation to one another. The linked elements 165 can be connected to each other in any manner, preferably in a manner that allows a flexible, pivotable, or resilient connection. In some embodiments, the skirt 160 can include a plurality of metal chains or other metallic strands that comprise multiple interlocked components. In other embodiments, the chain skirt 160 may be made of other materials such as rubber, silicon, and other flexible type materials. The chain skirt 160 is preferably attached to the lure body 110 and can serve to mask, camouflage, or shroud the hook assembly 120.

The skirt 160 can be attached to the lure body 110 in various manners. The strands 162 should preferably, though not required, be attached so that they extend from the lure body 110 and mask or partially mask the hook assembly 120. One attachment feature includes attaching a plurality of the strands 162 directly to the lure body 110, as pictured. But the strands 162 need not be directly attached to the lure body 110.

Figure 2A:
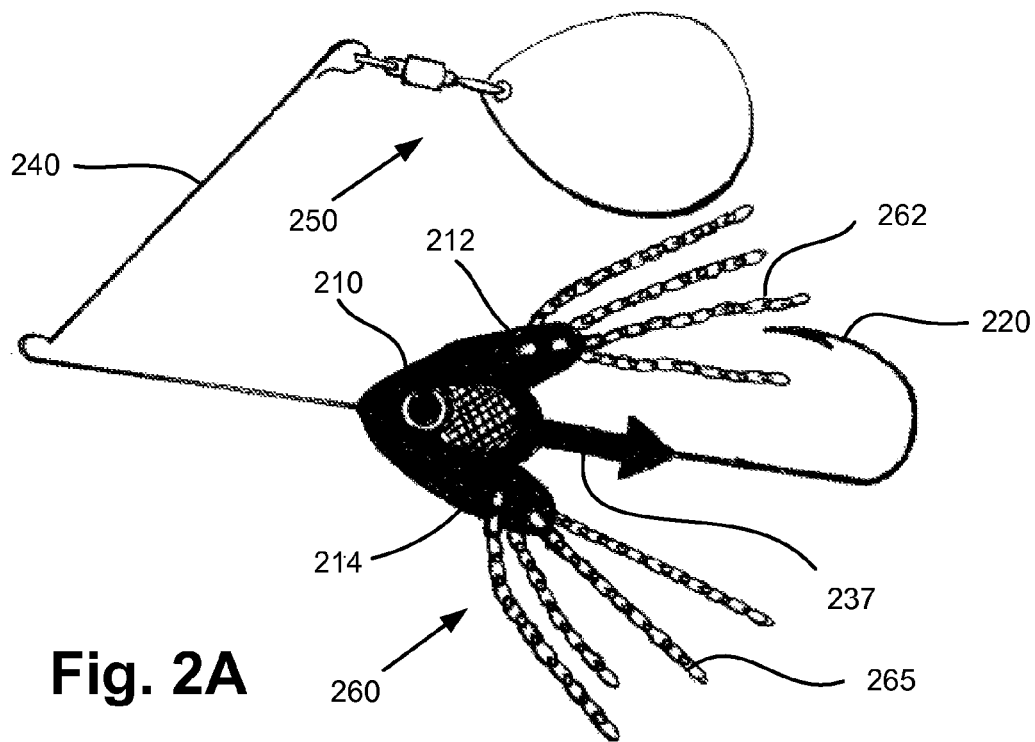
FIG. 2A illustrates a side view of a spinnerbait fishing lure in accordance with an embodiment of the present invention, the spinnerbait excluding a traditional skirt.
Figure 2B:
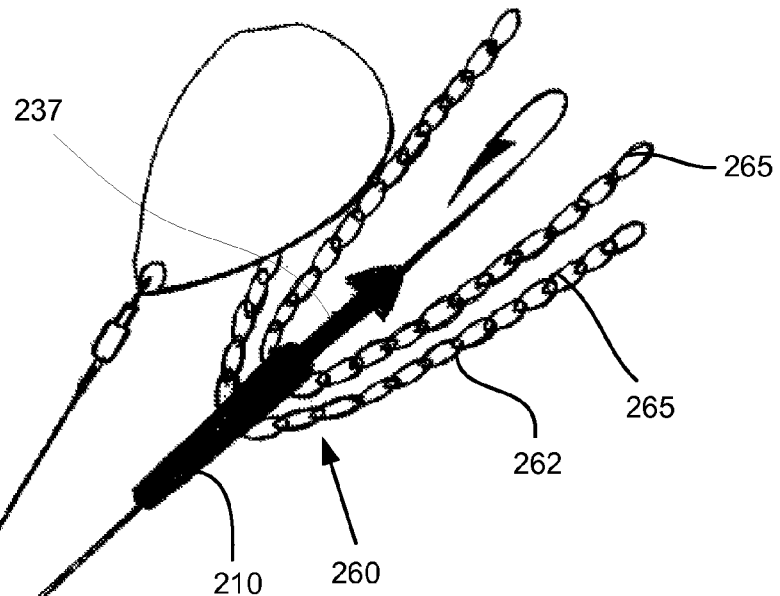
FIG. 2B illustrates a top view of the fishing lure of FIG. 2A.

FIG. 2A illustrates a side view of another spinnerbait fishing lure 200 in accordance with an embodiment of the present invention. FIG. 2B illustrates a top view of the same fishing lure 200. This embodiment comprises a lure body 210, a hook assembly 220, a V-wire 240, a spinner assembly 250, and a chain skirt 260. Whether or not a conventional skirt is included, as is not the case here, the fishing lure 200 can comprise a skirt holder 237 for carrying a conventional skirt or for carrying a skirt of the present invention.

The fishing lure 200 can comprise lure body extensions 212 on the lure body 210. The lure body extensions 212 can comprise apertures 214 for attaching strands 262 of the chain skirt 260. Alternatively, in some embodiments, the strands 262 may not be disposed on extensions 212.

Figure 3B:
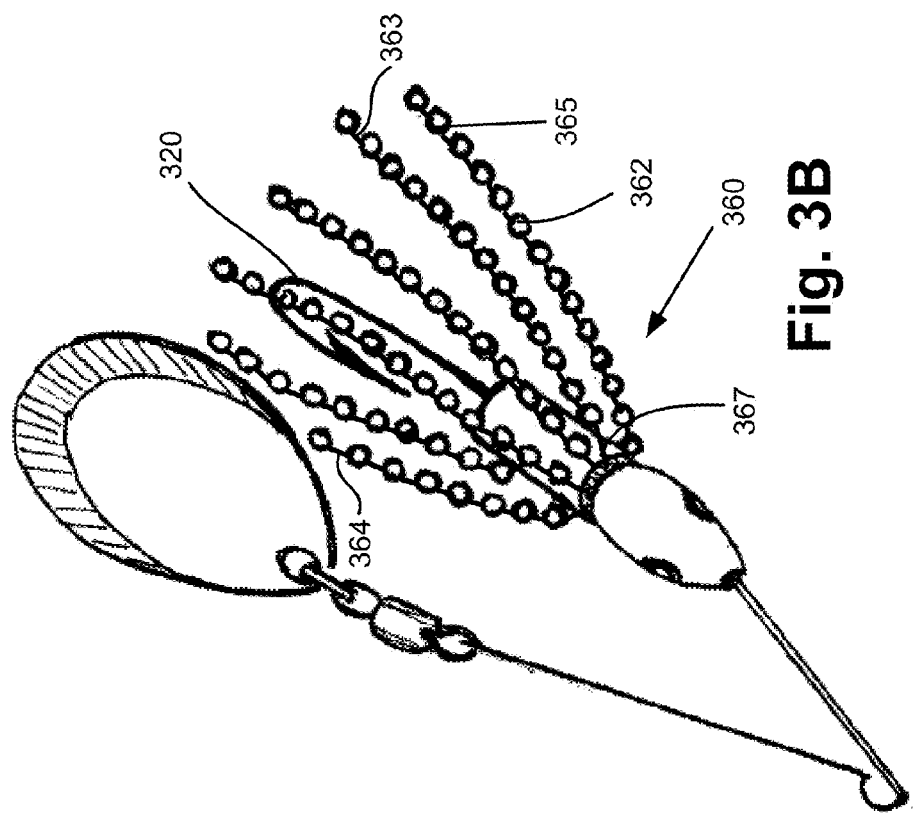
FIG. 3B illustrates a side view of the fishing lure of FIG. 3A.
Figure 3A:
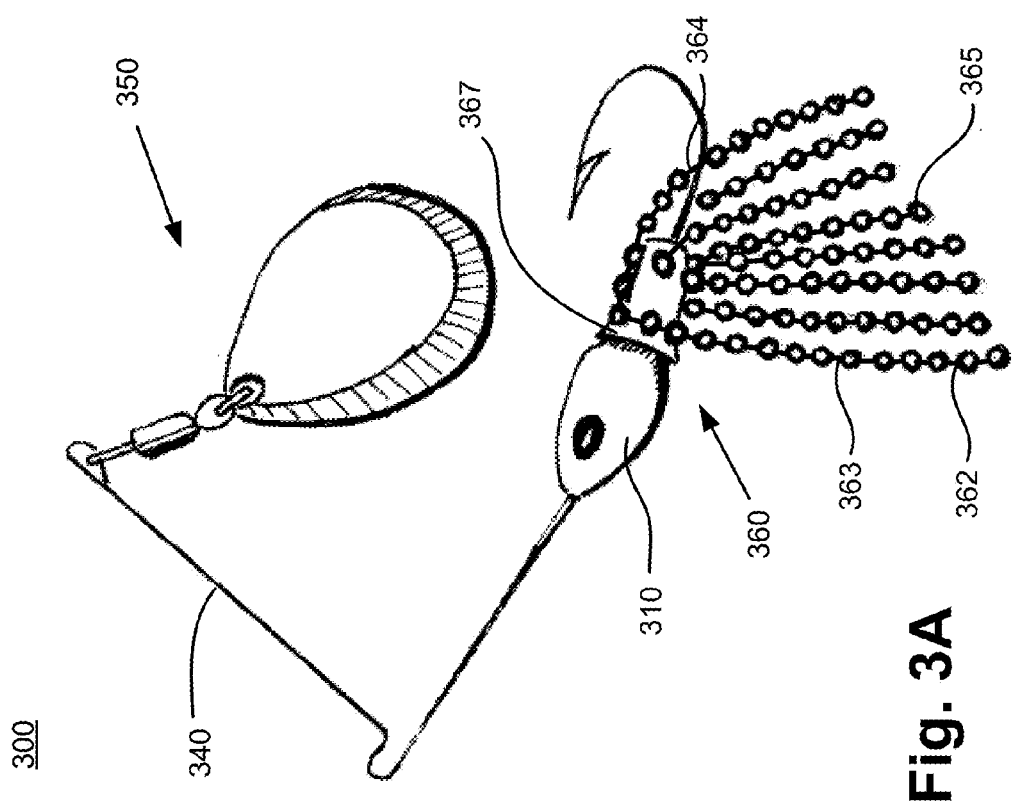
FIG. 3A illustrates a top view of a spinnerbait fishing lure in accordance with an embodiment of the present invention, the spinnerbait including a collar.

FIG. 3A illustrates a top view of a spinnerbait fishing lure 300 in accordance with an embodiment of the present invention, and FIG. 3B illustrates a side view of the same fishing lure 300. The fishing lure can comprise a lure body 310, a hook assembly 320, a V-wire 340, a spinner assembly 350, and a chain skirt 360.

Skirts and lures of the present invention may be manufactured according to a number of methods. For example, skirts can be held in place by surgical tubing that is pre-punched and glued to the lure body. The pre-punched holes can serve as connecting means for skirt strands, and the tubing can be wrapped around the lure body. Alternatively, a skirt can be manufactured by attaching a chain directly to the lure body 310, or lead head, with pre-molded holes or apertures 214, as in the previous figure. Instead of being attached directly to the lure body 310, the chain skirt 360 can be attached to a collar 367. The collar 367 can be a pre-punched plastic rim or ring to hold the chain in place and then attaching the rim or ring to the body or head of the lure with an adhesive.

In an embodiment of the present invention, strands 362 of the chain skirt 360 can be made of linked elements 365, such as stainless steel bead chain elements. The chain skirt 360 can come in a number of sizes for a variety of lure sizes, including lures for freshwater and lures for saltwater. Thus, embodiments of the present invention can be used for a variety of sizes for different style lures depending on the depth of water and the eight of the lure body 310.

The linked elements 365 may each comprise an aperture 363, or socket, and an extending member 364, such that each element's extending member 364 can be inserted into an adjacent element's socket 363 and, perhaps, secured with an adhesive. For metal spoons, surgical tubing or a bonding agent can be directly applied to a metal and chain.

FIG. 4A and FIG. 4B show two perspectives of another spinnerbait fishing lure 400 in accordance with an embodiment of the present invention. FIG. 4A illustrates a side view, and FIG. 4B illustrates a top view. The pictured fishing lure comprises a lure body 410, a hook assembly 420, a V-wire 440, a spinner assembly 450, and a chain skirt 260.

The strands 462 of the chain skirt 460 can be attached to a spacer element 468, which spaces the skirt strands 462 away from the lure body 410. The spacer 468 can enable disposition of the chain around the lure body 410 and can also enable strands 462 of the skirt 460 to be disposed in a substantially linear fashion, a circular pattern, as well as other various geometric configurations. Extending away from and about the lure body 410, the strands 462 can form a partial metallic shroud around the lure body 410.

The spinner assembly 450 can comprise a spinner blade 452 and, additionally, a second blade 470 for attracting fish.

Various embodiments of the invention include other advantageous features. Indeed, one feature includes distributing the weight of a metallic feature along the body of the lure 400 such that weight density of the lure 400 is generally constant along the length of the lure 400. This feature enables reduction of weight of the head portion of the lure body 410, so that weight can be distributed along the length of the lure 400. Linked metallic members 465 enable increased reflectivity to enhance the lure 400 for fish, and also enhanced vibration for the purpose of attracting fish through sound. Chain skirts 460 can add sound because the metal can vibrate under water and the strands 462 can flex and swivel, or can strike underwater obstacles, such as rocks, stumps, logs, bridge pilings, and the like. Points of interaction between the linked elements 462 can be sound points, emitting sound when adjacent linked elements 465 collide with each other. The skirts 460 can also add flash because of the reflective properties of metal and metallic-like materials.

Figure 5:
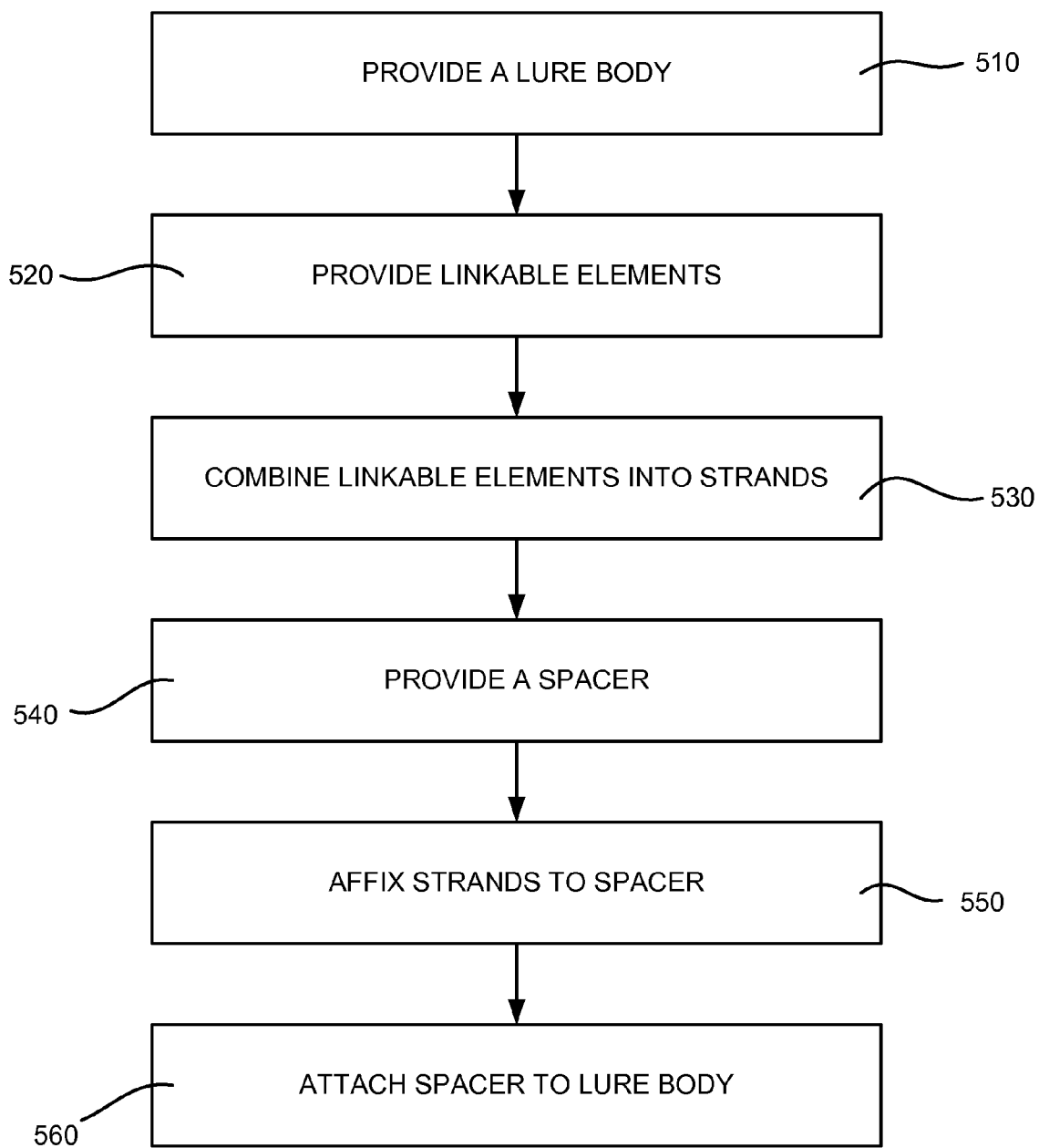
FIG. 5 is a flow chart demonstrating a method for manufacturing a fishing lure in accordance with an embodiment of the present invention.

FIG. 5 is a flow chart demonstrating a method for manufacturing a fishing lure in accordance with an embodiment of the present invention. While FIG. 5 illustrates certain combining of parts, such as the combining of individual linkable elements into strands, a manufacturer may receive the parts pre-combined and, therefore, may avoid combining certain parts. For example and not limitation, the strands may arrive at a manufacturer with the individual linkable elements pre-linked. In that case, no combining of linkable elements may be desired or necessary. Further, the order of manufacturing steps, as shown in FIG. 5, is not required. Those of skill in the art would recognize that any logical order of steps can be taken.

At step 510, the manufacturing process may involve providing a lure body. The lure body may have a head at one end and a hook at the other end. At step 520, individual linkable elements may be provided. The linkable elements may be substantially similar in shape.

By linking the linkable elements together, the linkable elements can be combined into a plurality of strands at step 530. As each strand is made up of the now-linked elements, the strands are of a segmented nature. The linked elements can be linked together in such a way that, when the lure body moves in a non-linear fashion, the strands sway.

The strands may be attached to the lure body. Optionally, this attaching may be implemented by providing a spacer at step 540. The strands may be affixed to the spacer at step 550. At step 560, the spacer may be attached to the lure body such that the spacer is at least partially disposed around the lure body. Affixing the strands to the spacer may involve punching holes into the spacer and attaching one strand to each hole. The use of holes, however, and the one-to-one ratio of holes to strands are not required. Further, use of a spacer is not required. Regardless of whether a spacer is provided, attachment of the strands to the lure body results in a skirt of elongated strands extending from proximate the lure body.

While the invention has been disclosed in its preferred forms, it will be apparent to those skilled in the art that many modifications, additions, and deletions can be made therein without departing from the spirit and scope of the invention and its equivalents, as set forth in the following claims.

We claim:

1. A fishing lure, comprising:
    a fishing lure body attached to a fish hook assembly, the fishing lure body comprising an exterior surface defining sides that merge together to form a head portion having a tapered end;

the fish hook assembly comprising at least one shank portion and curved portion, the at least one shank portion having an end directly attached to the fishing lure body and a portion spaced apart from the fishing lure body that transitions into the curved portion, and the curved portion comprising a sharp, pointed end for catching fish; and a skirt comprising a plurality of flexible arms, each of the plurality of flexible arms securely carried on a first end thereof by the fishing lure body and having a second, free end, wherein:

the plurality of flexible arms forms an elongated skirt for surrounding and obscuring at least a portion of the fish hook assembly; and each of the plurality of flexible arms comprises a plurality of interlocked elements each having a same three-dimensional geometrical shape, the plurality of interlocked elements extending from the first end to the second end, and forming a chain such that each interlocked element is flexible with at least one other interlocked element of the plurality of interlocked elements.

2. The fishing lure of claim 1, wherein the interlocked elements comprise at least one of beads, chain links, ball elements, and strand elements.

3. The fishing lure of claim 1, wherein the flexible arms comprise sound points at each intersection of the interlocked elements, such that the sound points emit audible sound along an entire length of each of the arms as the skirt moves through a medium, the audible sound generated by the sound points being caused by an impact between adjacent interlocked elements of the plurality of interlocked elements.

4. The fishing lure of claim 1, wherein the interlocked elements are each substantially similar metallic elements pivotably connected to at least one other metallic element of the metallic elements, such that the flexible arms comprise a plurality of flex points along lengths thereof.

5. The fishing lure of claim 1, further comprising a conventional skirt positioned to overlap the skirt comprising the plurality of flexible arms from a front orthographic viewing location and a plurality of additional perpendicular orthographic viewing locations.

6. The fishing lure of claim 1, wherein the fishing lure body extends along a longitudinal axis from the head portion to a rear portion thereof, and one or more of the plurality of flexible arms extends linearly from the rear portion proximate the longitudinal axis.

7. The fishing lure of claim 1, wherein the interlocked elements each have two or more of a same length, a same width, and a same height.

8. The fishing lure of claim 1, wherein the skirt provides a constant weight density along a total length of the fishing lure.

9. A fishing lure comprising:
a lure body portion comprising a head body portion having a tapered end and having an exterior surface simulating an appearance of a baitfish;
a fish hook assembly having a first end connected to a rear portion of the lure body portion, the fish hook assembly having at least one curved portion spaced apart from the lure body portion, the at least one curved portion defining a sharp point for catching fish, the sharp point being spaced away from the first end of the fish hook assembly; and
a skirt assembly disposed at least partially around the lure body portion, the skirt assembly comprising multiple skirt elements configured to at least partially shroud the fish hook assembly, the skirt elements comprising a plurality of flex points along lengths thereof and each of the skirt elements having a first end attached to the lure body portion and a second, free end, wherein:
each of the skirt elements comprises multiple coupled components adapted to flex relative to one another; and
each of the coupled components has two or more of a same length, a same width, and a same height, and is linked to another coupled component of the multiple coupled components in series such that the coupled components collectively form a repeating geometric pattern from the first end to the second end.

10. A fishing lure of claim 9, wherein the coupled components each have a same three-dimensional geometrical shape and comprise a reflective exterior such that the skirt elements comprise multiple coupled reflective elements along the lengths of the skirt elements.

11. The fishing lure of claim 9, wherein the multiple coupled components form a strand of beads, each of the beads having a same geometric shape and comprising an extension and an aperture, and wherein the extension of each bead is configured for insertion into the aperture of an adjacent bead of the strand of beads.

12. The fishing lure of claim 9, wherein the skirt elements further comprise a plurality of connection points disposed between each of the multiple coupled components, the connection points defining an interface to emit sound as the coupled components impact one another.

13. The fishing lure of claim 9, wherein the coupled components of the skirt elements are interlocked metallic chain elements each having a same geometric shape, and the interlocked metallic chain elements each allow the skirt elements to flex relative to one another and flex along total lengths of the skirt elements at multiple flex points.

14. The fishing lure of claim 9 further comprising a conventional skirt positioned to overlap the skirt assembly from a front orthographic viewing location and a plurality of additional perpendicular orthographic viewing locations.

15. The fishing lure of claim 9, wherein the lure body portion extends along a longitudinal axis from the head body portion to the rear portion, and one or more of the multiple skirt elements extends linearly from the rear portion proximate the longitudinal axis.

16. The fishing lure of claim 9, wherein the coupled components each have a same length, a same width, and a same height.

17. A fishing lure comprising:
a lure body having a fish hook assembly attached thereto, the fish hook assembly extending away from an area proximate a rear portion of the lure body and ending in at least one curved portion having a sharp end configured to catch fish;
a spinner blade assembly comprising at least one spinner blade;
a V-wire having an elongated linear shape in a substantial V-shape, the V-wire having a first end, a second end, and an apex point disposed between the first end and the second end, the first end of the V-wire being attached to the lure body and the second end of the V-wire being attached to the spinner blade assembly; and
a chain skirt having multiple chain strands, each of the chain strands comprising a first end attached to the lure body and a second end, and consisting of a plurality of repeating interlocked elements, the chain strands being disposed to at least partially shroud at least a portion of the fish hook assembly, wherein the second ends of the chain strands are not attached to the lure body enabling the second ends of the chain strands to flow freely about the lure body, and the chain skirt provides a constant weight density along a total length of the fishing lure.

18. The fishing lure of claim 17, wherein the plurality of repeating interlocked elements are each a same three-dimensional geometric shape and each comprise at least one of beads, chain links, ball elements, and strand elements.

19. The fishing lure of claim 17, wherein the lure body extends along a longitudinal axis from a head portion to the rear portion, and one or more of the chain strands extends linearly from the rear portion proximate the longitudinal axis.

20. The fishing lure of claim 17 further comprising a conventional skirt positioned to overlap the chain skirt from a front orthographic viewing location and a plurality of additional perpendicular orthographic viewing locations.

* * * * *